United States Patent [19]

Hunter et al.

[11] Patent Number: 5,390,758
[45] Date of Patent: Feb. 21, 1995

[54] MOTOR MOUNT

[75] Inventors: Timothy G. Hunter, Milwaukee; John J. Myers, Pewaukee; Paul C. Wiers, Wauwatosa, all of Wis.

[73] Assignee: Harley-Davidson, Inc., Milwaukee, Wis.

[21] Appl. No.: 139,406

[22] Filed: Oct. 19, 1993

[51] Int. Cl.$^6$ .............. B62K 11/04; B62K 25/04; B62M 7/04
[52] U.S. Cl. ................ 180/228; 180/227; 248/635; 248/659
[58] Field of Search ........... 180/228, 227, 219, 295, 180/299; 248/635, 638, 659

[56] References Cited

U.S. PATENT DOCUMENTS

| | | | |
|---|---|---|---|
| 2,743,783 | 5/1956 | Kreidler | 180/228 |
| 3,508,765 | 4/1970 | Bauer et al. | 280/281.1 |
| 3,542,146 | 11/1970 | Hooper et al. | 180/228 |
| 3,616,870 | 11/1971 | Kramer | 180/227 |
| 3,722,612 | 3/1973 | Issigonis et al. | 180/227 |
| 3,754,612 | 8/1973 | Watanabe et al. | 180/228 |
| 3,783,961 | 1/1974 | Hooper | 180/228 |
| 3,811,528 | 5/1974 | Hooper | 180/228 |
| 4,055,229 | 10/1977 | Lindsay | 180/219 |
| 4,207,960 | 6/1980 | Hashimoto | 180/228 |
| 4,230,074 | 10/1980 | Ichikawa et al. | 123/55 R |
| 4,237,996 | 12/1980 | Matsuda et al. | 180/229 |
| 4,323,135 | 4/1982 | Tominaga et al. | 180/228 |
| 4,324,306 | 4/1982 | Ishihara et al. | 180/228 |
| 4,360,214 | 11/1982 | Isono | 280/284 |
| 4,392,542 | 7/1983 | Aiba | 180/228 |
| 4,412,597 | 11/1983 | Aiba | 180/228 |
| 4,421,195 | 12/1983 | Aiba | 180/228 |
| 4,465,157 | 8/1984 | Onishi et al. | 180/228 |
| 4,550,698 | 11/1985 | Könneker | 180/228 X |
| 4,671,375 | 6/1987 | Oike et al. | 180/227 |
| 4,706,774 | 11/1987 | Tsuboi | 180/227 |
| 4,724,920 | 2/1988 | Tsuchida et al. | 180/227 |
| 4,744,434 | 5/1988 | Miyakoshi et al. | 180/227 X |
| 4,809,801 | 3/1989 | Enoki | 180/228 |
| 4,928,781 | 5/1990 | Kawano | 180/227 |
| 5,109,943 | 5/1992 | Crenshaw et al. | 180/228 |

FOREIGN PATENT DOCUMENTS

| | | | |
|---|---|---|---|
| 866584 | 3/1971 | Canada . | |
| 2301431 | 10/1976 | France . | |
| 0036393 | 8/1965 | Germany | 180/228 |
| 598754 | 2/1948 | United Kingdom . | |
| 2084525A | 4/1982 | United Kingdom . | |

Primary Examiner—Margaret A. Focarino
Assistant Examiner—F. Zeender
Attorney, Agent, or Firm—Michael, Best & Friedrich

[57] ABSTRACT

A motorcycle has a frame, a swing arm pivotally mounted on the frame about a pivot axis, a wheel rotatably mounted on the swing arm and an engine pivotally mounted on the frame about the pivot axis. A first elastomer engine mount couples the engine to an upper portion of the frame and a second elastomer engine mount couples a lower portion of the engine to a lower portion of the frame. The engine mounts are spaced from each other and the pivot axis.

6 Claims, 2 Drawing Sheets

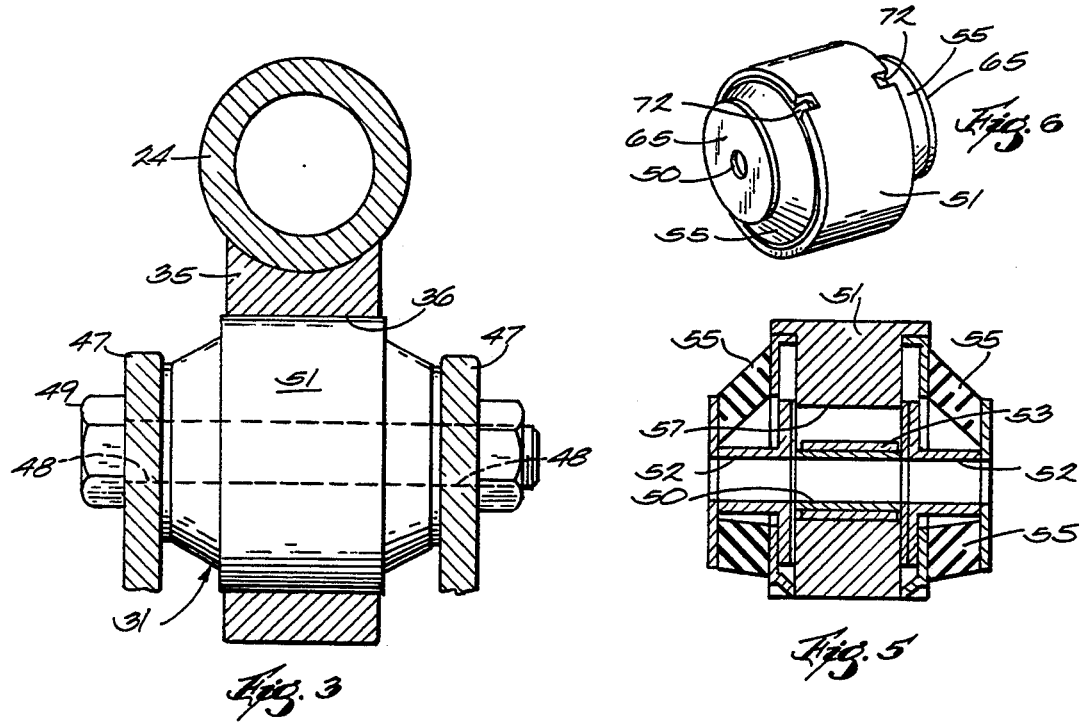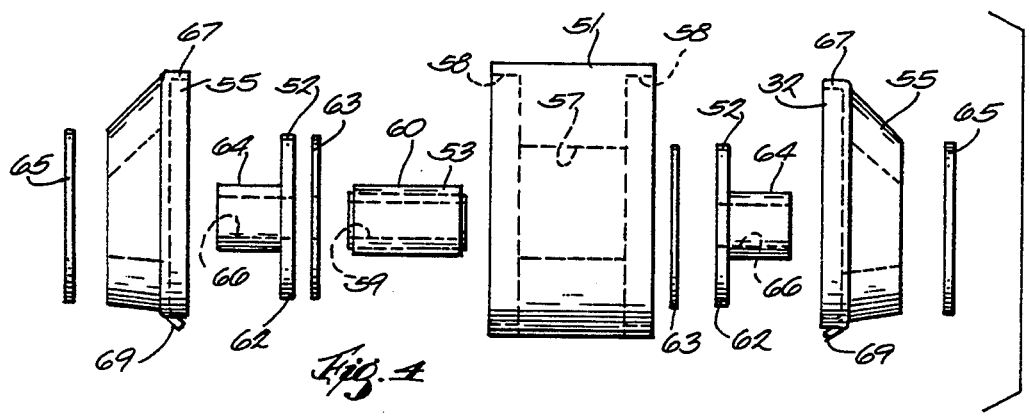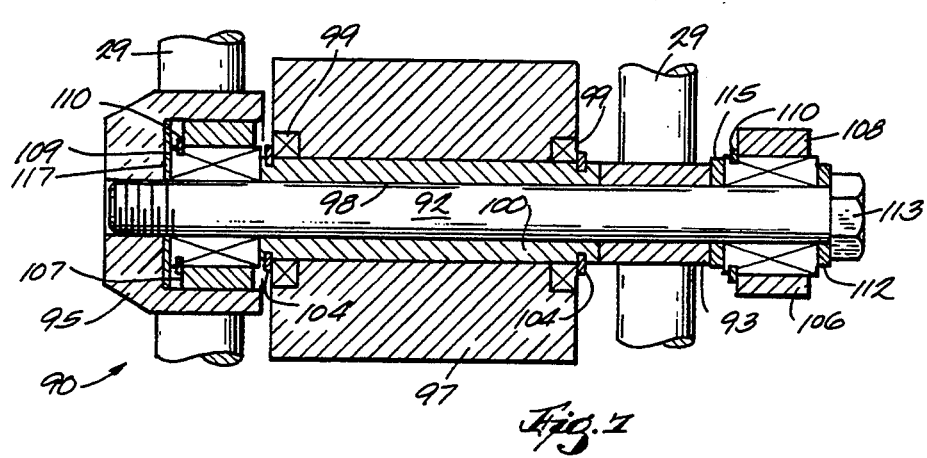

MOTOR MOUNT

BACKGROUND OF THE INVENTION

This invention relates to motorcycles and more particularly to means for mounting an engine on a motorcycle frame.

The vibration caused by internal combustion engines results in discomfort and fatigue for motorcycle operators and passengers. In addition, engine shaking forces are the primary cause of many noise and component fatigue problems. For this reason, a primary concern in the design of motorcycles is the isolation of such engine shaking forces.

Prior art systems for isolating motorcycle engine vibrations have several inherent disadvantages. For example, the engine movement allowed by one type of prior art isolation system causes design problems when considering belt or chain performance. This is often overcome by rigidly attaching the rear swing arm pivot of the motorcycle to the engine. However, this expedient produces another problem relating to handling and road-tire interaction. More particularly, if the swing arm is pivoted on the engine, part of the road load is transmitted through the tire to the swing arm, through the engine, and to the engine mounts so that the road load path is no longer transmitted solely through the frame. As a result, the engine is no longer supported solely by the engine mounting system. In other words, the engine is partially supported by the path consisting of the engine swing arm, the rear shocks and the frame. This requires that an engine mounted in this manner be tuned to adequately address handling problems while attempting to maintain the intended engine isolation. These are often two conflicting goals and often require a compromise which introduces one or more engine mount resonances in the operating range of the vehicle.

SUMMARY OF THE INVENTION

It is an object of the invention to provide a new and improved motorcycle engine mounting system.

Another object of the invention is to provide a motorcycle engine mounting system which is isolated from the road/tire system.

A further object of the invention is to provide a motorcycle engine mounting system which is not a part of the road load path.

It is another object of the invention to provide a motorcycle wherein the suspension system does not form a part of the engine mounting system.

These and other objects and advantages of the invention will become more apparent from the detailed description thereof taken with the accompanying drawings.

In general terms, the invention comprises the combination of a motorcycle having a frame, swing arm means pivotally mounted on the frame about a pivot axis, a wheel rotatably mounted on the swing arm means, an engine pivotally mounted on the frame about the pivot axis, and at least first and second motor mounts for coupling the engine to the frame at locations spaced from each other and the pivot axis. In more specific terms, each motor mount includes elastomer means for resiliently coupling the engine to the frame, the frame including an upper section, and a lower section having front and rear portions, the first motor mount being mounted on the upper section for coupling an upper portion of the engine to the frame, the pivot axis being located adjacent the rear portion of the lower section and the second motor mount being located adjacent the front portion of the lower section for coupling the front portion of the engine to the frame. Pin means is mounted on the frame to define the pivot axis and the swing arm means has a pair of arms each of which is pivotally mounted at one end around the pin means, and pivot means mounted on the engine and is pivotally mounted on the pin means between the arms.

BRIEF DESCRIPTION OF THE DRAWINGS

FIG. 3 is a cross-sectional view of a first portion of the engine mounting system shown in FIG. 1;

FIG. 4 is an exploded view of an engine mount of the engine mounting system shown in FIG. 3;

FIG. 5 is a cross-sectional view of the engine mount shown in FIG. 4;

FIG. 6 is a perspective view of the engine mount shown in FIG. 4; and

FIG. 7 is a cross-sectional view of a second portion of the engine mounting system shown in FIG. 1.

DETAILED DESCRIPTION OF THE PREFERRED EMBODIMENT

Figure 1:
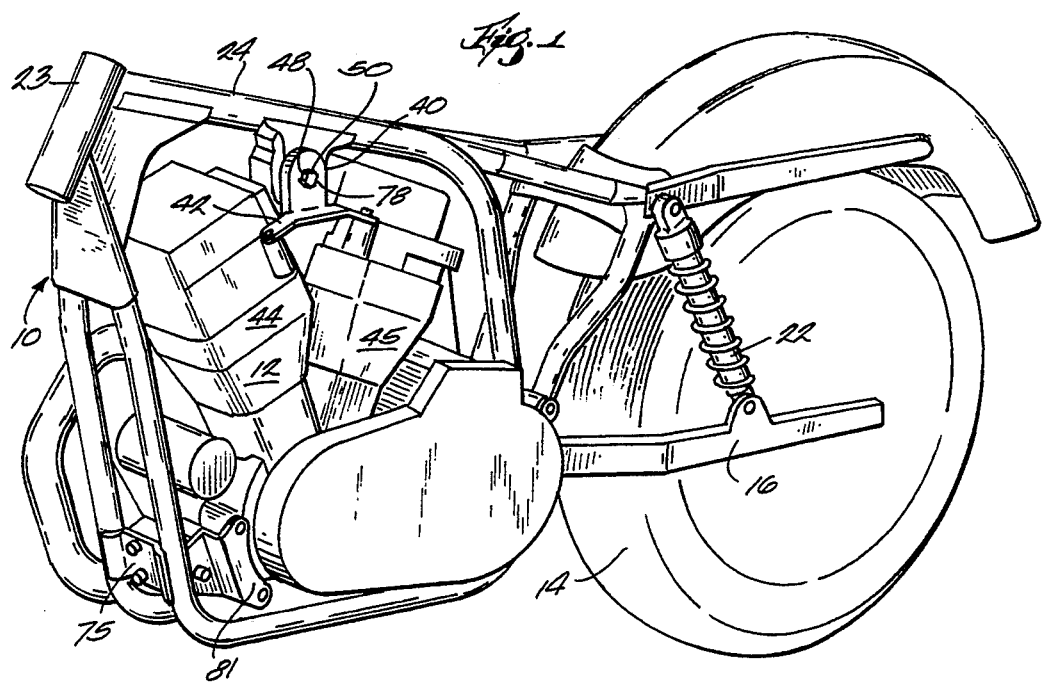
FIG. 1 shows a portion of a motorcycle illustrating the environment for the engine mounting system according to the invention.
Figure 2:
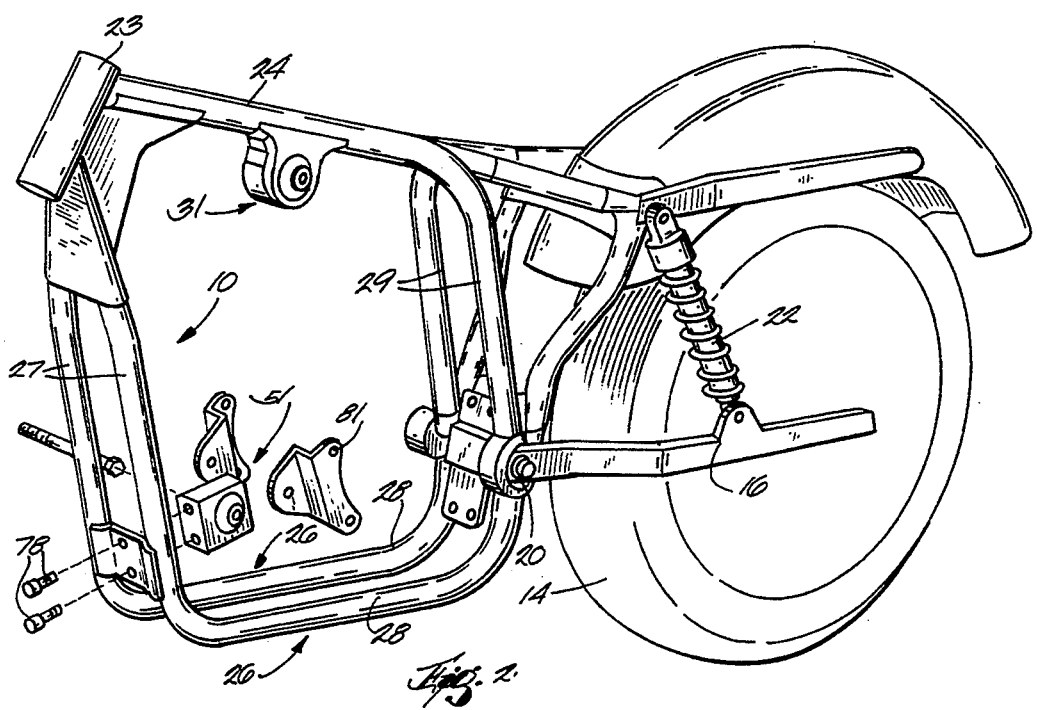
FIG. 2 shows the motorcycle portion illustrated in FIG. 1 minus the engine.

FIG. 1 shows a portion of a motorcycle which includes a frame 10, an engine 12 mounted on the frame by a mounting system which will be described in greater detail below. A rear wheel 14 is rotatably mounted by means of an axle and bearing (not shown) on a rear fork or swingarm 16. A drive sprocket 18 may be mounted on the rear wheel hub and is coupled to the engine 12 by means of a belt or chain (not shown). The forward end of the swingarm 16 is pivotally mounted on the frame 10 by means of a pivot 20 as seen in FIG. 2. One or more shock absorbers 22 may be coupled to the frame 10 and each extends therefrom to the swingarm 16. Those skilled in the art will appreciate that the motorcycle will also include a front fork, a front wheel, handlebars, a gas tank, a seat and instruments, all of which are conventional and are not shown for the sake of brevity.

With reference to FIG. 2, the frame 10 is formed of tubular members and includes a front fork bearing 23, a top tube 24 which is attached at its forward end to the fork bearing 23, and a pair of U-shaped tubes 26 each of which includes a first section 27 extending downwards from the front fork bearing 23, a second section 28 extending rearwards from the lower end of each section 27 and a third section 29 which extends upwards with their upper ends being attached to the rear end of section 24. A first engine mount 31 is supported intermediate the ends of the upper tube 24 and a second engine mount 32 is supported between the lower ends of the tube sections 27.

The first engine mount 31 is supported by a bracket 35 which is suitably secured to and extends downwardly from section 24 as shown in FIG. 3. Bracket 35 has a large central hole 36 in which the mount 31 is secured. The engine 12 is coupled to the mount 30 by a pair of brackets 40, shown in FIG. 1 to be secured in an opposed relation on the opposite sides of the engine 12. Each bracket 40 has a base 42 secured at its opposite ends to the engine cylinders 44 and 45 by suitable screws. Each bracket also has an upstanding ear 47 having an aperture 48 which is coaxial with the corresponding opening in the bracket 40 at the opposite side of the engine. The ears 47 are secured to the mount 31 by means of a bolt 49 which extends through the openings 48 and bore 50 in the mount 31.

The engine mount 31 is shown in FIGS. 4, 5 and 6 to include a metallic housing 51, a pair of metallic bushings 52, a metallic sleeve 53, and a pair of elastomer members 55. The frame housing 50 is cylindrical and has a central bore 57 for receiving the sleeve 53 and a circular recess 58 is formed in each end face for receiving the elastomer members 55. The metallic sleeve 53 has a central bore 59 and, to ensure that there is no metal-to-metal contact between it and the surface of bore 57, may have an elastomer coating 60. The bushings 52 each have an annular end flange 62 and a tubular body 64 which defines a cylindrical bore 66. The bushings 52 are disposed on the opposite sides of housing 51 with the flanges 62 engaging the surface of the recess 58 and the bores 66 axially aligned with the passage 59. The surface of the flanges 62 may be provided with a glass-filled, nylon face layer 63 to provide stiffness in the axial direction. A metallic washer 65 is fixed to the outer face of each elastomer member 55 and a sheer isolator ring 67 is fixed to the large diameter ends of each.

The elastomer members 55 are shown in FIGS. 4, 5 and 6 in their no-load condition wherein they have the shape of an eccentric annulus. Under load, however, the elastomer members deform so that they are substantially concentric as shown in FIG. 3. In order to ensure that the elastomer members 55 are properly oriented relative to the housing 51, each ring has an obliquely extending finger 69 which engages in one of a pair of slots 72 formed in the outer rim of housing 51.

The bushings 52 limit movement of the engine in the direction parallel to the pivot axis defined by pin 92. Movement of the engine in a plane perpendicular to the axis of pin 92 is limited by the sleeve 53 and the elastomer members 55 are isolated from shear in this plane by the shear isolators 67.

The second motor mount 32 is identical to mount 31 and is located between the lower ends of the tubular portions 27 of frame 10 by means of a bracket plate 75 secured between the tubular frame sections 27 and a bracket 76 secured perpendicularly to the plate 75 by means of screws 78. Bracket 76 has a large aperture 79 for receiving the housing 51 of mount 32. A pair of brackets 81 are suitably secured to the opposite sides of the engine 12 and are secured to the mount 32 by a bolt in the same manner as the brackets 40 are secured to the mount 31. While two engine mounts 31 and 32 are shown, more than two may be employed without deviating from the invention. Preferably, the stiffness of the elastomer members 55 of the motor mounts 31 and 32 are identical. However, the invention contemplates the use of members having different stiffnesses in mounts 31 and 32.

FIG. 7 shows the rear pivot mount 90 for the swingarm 16 and the engine 12 as viewed from the rear of the vehicle. The pivot 90 includes a pivot pin or bolt 92 which extends through a first tubular member 93 fixed to the frame member 29 on one side of the motorcycle and is threaded at its opposite end into a cup shaped member 95 fixed to the frame member 29 at the opposite side. Means are provided for pivotally coupling the engine 12 to the pivot bolt 92 such as, for example, a pivot plate 96 which extends integrally from the lower rear of the engine and has a transverse bore 97 for receiving the bolt 92. In the preferred embodiment, a spacer sleeve 98 is disposed between the bolt 92 and pivot plate 96 and bearings 99 are disposed between plate 96 and sleeve 98. Snaprings 104 maintain the pivot plate 96 in the desired position between frame sections 29. The swingarm 16 includes a pair of arms, each of which has an annular bushing 106 and 107 at its end for being pivotally mounted adjacent the opposite sides of the pivot bolt 92 by means of bushings 108 and 109, respectively. Snaprings 110 retain the bushings 106 and 107 in position on the bearings 108 and 109. A hardened washer 112 may be disposed between one side of the bearing 108 and the head 113 of pivot bolt 92 and a second hardened washer 115 may be disposed between the bearing and the end of the tubular member 93. In addition, the surface 117 on the inside face of member 95 may also be hardened.

By attaching this swing arm pivot to the frame and attaching the engine 12 to the frame by means of mounts 31 and 32 and a pivot which is coaxial to the swing arm pivot, the engine mounting system is decoupled from the road/tire system. In this configuration, road loads are passed from the tire to the swing arm, then into the frame and from the tire into the swing arm and to the shock absorbers 22 and then to the frame. The road load path does not pass through the engine or the engine mounts. The engine is thus free to move in the plane of the vehicle about the axis of pivot bolt 92. Some engine shaking forces will be passed into the frame by the engine mounting system. This is minimized by changing the balance factor to orient the shaking force ellipse to be tangent to the circle centered about the engine pivot. The engine mounts 31 and 32 can easily be tuned to keep the engine mounting system resonances out of the operating range of the vehicle. The change in the belt chain length is minimized by locating the drive sprocket close to the engine pivot. This invention effectively isolates the engine without impacting ride or belt or chain life. The bushings 52 limit motion of the engine in a direction parallel to the axis of bores 66 and the sleeve 53 limits movement in a plane perpendicular to this axis.

While only a single embodiment of the invention has been illustrated and described, it is not intended to limit the invention thereby, but only by the scope of the appended claims.

We claim:

1. The combination of a motorcycle having a frame which includes an upper section and front and rear portions, an engine, first engine mounting means on said upper section and connected to an upper portion of the engine, second engine mounting means on said front portion and connected to a front portion of the engine, pivot means mounted on said rear portion, a rear portion of the engine being pivotally connected to said pivot means, said first and second engine mounting means and said pivot means defining a plane, said engine being connected to said pivot means for pivotal movement about an axis perpendicular to said plane, a swing arm pivotally coupled to said pivot means for pivotal movement about said axis, said first and second engine mounting means each including resilient means for coupling said engine to said frame in a direction generally parallel to said plane to permit said engine to vibrate in said plane and restraining means for coupling said engine to said frame in a direction perpendicular to said plane to restrict motion in the direction perpendicular to said plane each of said-engine mounting means including elastomer means for resiliently coupling said engine to said frame and for permitting limited movement of the engine in said plane, said swing arm and engine being non-resiliently coupled to said pivot means to permit said engine and said swing arm to pivot in said plane but resists movement of said swing arm and engine in a direction perpendicular to the plane.

2. The combination set forth in claim 1 wherein said pivot means includes a pivot pin mounted on the frame and defining said axis, said swing arm having at least one arm which is pivotally mounted at one end on said pivot means, said engine and swing arm means being pivoted on said pivot pin.

3. The combination of a motorcycle having a frame which includes an upper section and front and rear portions, an engine, first engine mounting means on said upper section and connected to an upper portion of the engine, second engine mounting means on said front portion and connected to a front portion of the engine, pivot means mounted on said rear portion, a rear portion of the engine being pivotally connected to said pivot means, said first and second engine mounting means and said pivot means defining a plane, said engine being connected to said pivot means for pivotal movement about an axis perpendicular to said plane, a swing arm pivotally coupled to said pivot means for pivotal movement about said axis, said first and second engine mounting means each including resilient means for coupling said engine to said frame in a direction generally parallel to said plane to permit said engine to vibrate in said plane and restraining means for coupling said engine to said frame in a direction perpendicular to said plane to restrict motion in the direction perpendicular to said plane, said engine having a pair of cylinders arranged in a V-shape, said first engine mounting means being connected to said engine between said cylinders.

4. The combination set forth in claim 3 wherein each of said engine mounting means includes elastomer means for resiliently coupling said engine to said frame and for permitting limited movement of the engine in the plane.

5. The combination set forth in claim 4 wherein said swing arm and engine are non-resiliently coupled to said pivot means to permit said engine and said swing arm to pivot in said plane but resists movement of said swing arm and engine in a direction perpendicular to the plane.

6. The combination set forth in claim 3 wherein said pivot means includes a pivot pin mounted on the frame and defining said axis, said swing arm having at least one arm which is pivotally mounted at one end on said pivot means, said engine and swing arm means being pivoted on said pivot pin.

* * * * *